April 18, 1944.        R. H. CASLER ET AL        2,346,820
POWER GEAR SHIFTING MECHANISM
Filed Nov. 8, 1933        5 Sheets-Sheet 5

INVENTORS
Roger H. Casler and
Stephen Vorech
By N. W. Parker Jr.
his ATTORNEY

Patented Apr. 18, 1944

2,346,820

UNITED STATES PATENT OFFICE 2,346,820

POWER GEAR SHIFTING MECHANISM

Roger H. Casler and Stephen Vorech, Pittsburgh, Pa., assignors to Bendix-Westinghouse Automotive Air Brake Company, Pittsburgh, Pa., a corporation of Delaware Application November 8, 1933, Serial No. 697,193

59 Claims. (Cl. 74—335)

This invention relates to selective changespeed transmission mechanisms and more particularly to a control apparatus therefor.

It has heretofore been proposed to employ power means for effecting a change in the ratio of transmission gearing and with such an arrangement, control mechanisms for said power means have been utilized which have been conveniently located remotely from the transmission and readily accessible to the operator. The latter, when operating a motor vehicle equipped with such a structure, had merely to operate the conveniently-located control mechanism by a simple manual movement which thereby controlled the flow of fluid to said power devices to effect a change in the speed ratio of the transmission gearing. In the constructions heretofore utilized, however, the control devices operable by the operator have taken the form of rotatable valve mechanisms, switch contacts, push buttons and other devices, the operation or movement of which was totally dissimilar from the operation of the conventional gear shift lever which the power mechanism had replaced. Accordingly, an operator, accustomed to operating a vehicle provided with the conventional manually-operated gear shift lever, was compelled to change completely his accustomed methods of gear changing when it became necessary for him to operate a vehicle equipped with the above referred to remotely-controlled power gear shifting device. This has been found to be a rather serious disadvantage, resulting in confusion and improper operation of the prior power-operated change-speed transmissions.

It is, therefore, one of the objects of the present invention to provide a transmission gearing control mechanism so constituted as to avoid the above referred to difficulties.

Another object of the invention is to provide a power-operated selective gear-shifting mechanism so constructed and arranged that the movements of the same in effecting a control of the changing of the transmission gearing simulate in every respect the corresponding movements of a conventional manually-operable gear shift lever to the end that an operator may readily operate a vehicle equipped with such mechanism in the same manner as if the vehicle were provided with a manually-operable gear shift.

Another object is to provide in a transmission gearing controlling mechanism having gears shiftable by power, a manually-operable pivotally-mounted controlling device located adjacent the operator and movable in a manner simulating the movement of a conventional gear shift lever for controlling the shiftable gears.

Still another object contemplates the provision, in a device of the above character, of a remotely-positioned dummy gear shift lever operable in a gear-shifting simulating manner to effect the control of power to the power-operated gear-shifting mechanism, whereby an operator may readily and efficiently control the necessary changes in the gearing ratios of the transmission by manually moving a control member in the same manner as that to which he had been accustomed when manually shifting the transmission gearing.

A further object is to provide in a manually-controlled power-operated gear-shifting mechanism, a novel control apparatus therefor including an arrangement insuring that the extent of movement of the gear-shifting member will be substantially proportional to the extent of movement of the control member whereby an exceedingly accurate control may be exercised by the operator over the shifting of the gears.

A still further object is to provide a fluid pressure-operated power gear-shifting mechanism having a manually-operable control member and means controlled thereby in such a manner that the movements of such control member to effect a shifting of the transmission gears will be resisted by a force substantially proportional to the extent of movement of the gear-shifting member whereby a "feel" or reaction to shifting will be experienced by the operator in a manner simulating the reaction encountered in manually shifting transmission gears in the conventional manner.

A further object is to provide a novel arrangement of control apparatus for a mechanism of the above character which shall be readily accessible for operation, shiftable in the conventional manner, capable of ready installation upon motor vehicle transmissions and of rugged construction and economic cost.

Other objects and novel features of the invention will appear more fully hereinafter from the following description taken in connection with the accompanying drawings. It is to be expressly understood, however, that the drawings are employed for purposes of illustration only and are not designed as a definition of the limits of the invention, reference being had for such purpose to the appended claims.

Referring to the drawings, wherein similar reference characters refer to similar parts throughout the several views.

Figure 1:
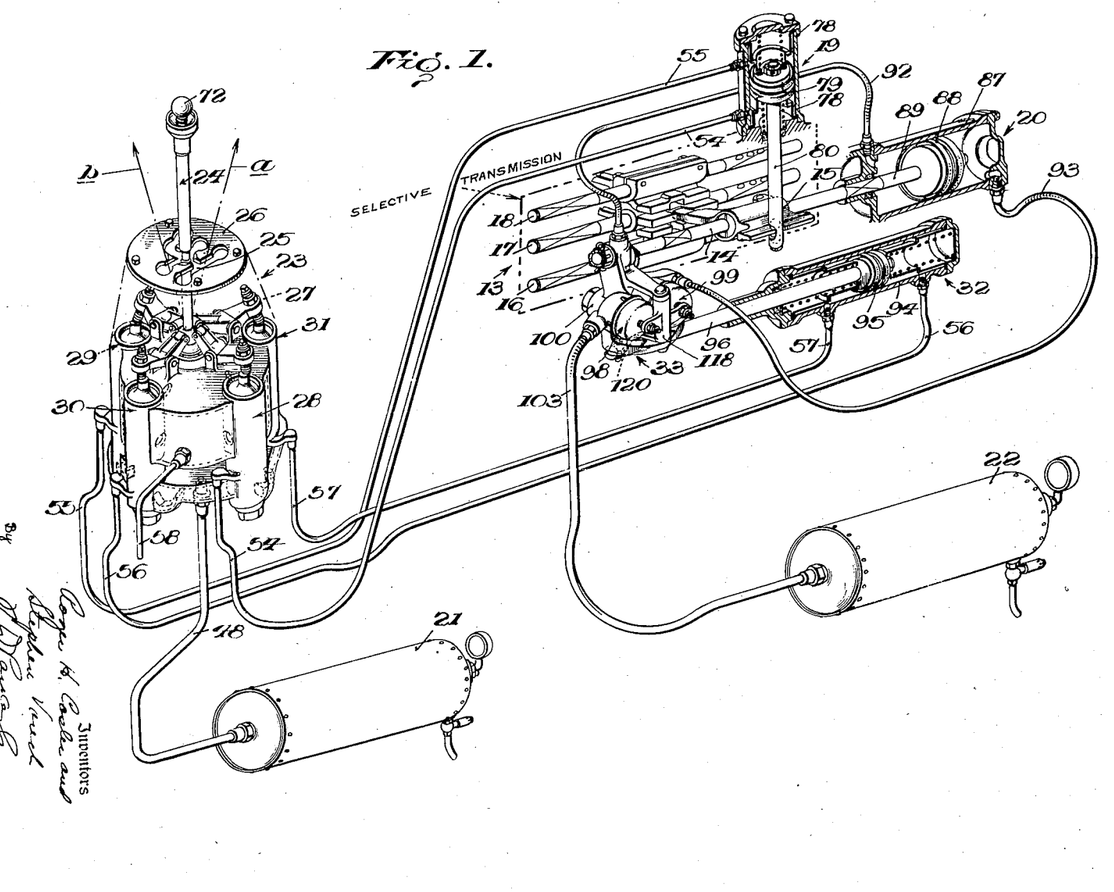
Fig. 1 is a diagrammatic view, having certain parts in section, of a gear-shifting control mechanism constructed in accordance with the principles of the present invention.
Figures 2, 3, 4, 5:
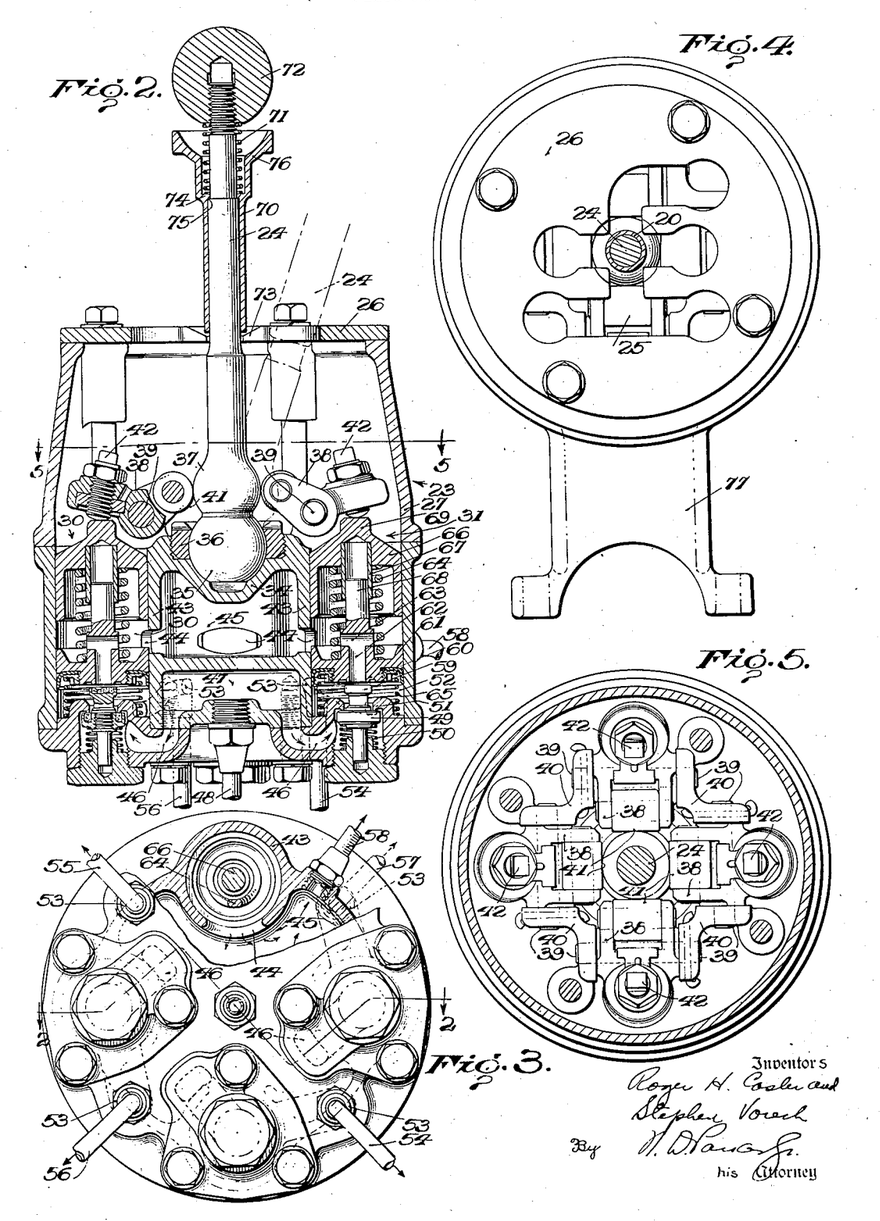
Fig. 2 is a sectional view of the manually-operable control device.
Fig. 3 is a bottom plan view, partly in section, of the control device of Fig. 2.
Fig. 4 is a top plan view of the device of Fig. 2.
Fig. 5 is a top view of the parts of Fig. 2 taken along line 5—5 of said Figure.

Referring more particularly to Fig. 1, a transmission control device embodying the principles of the present invention is illustrated therein in connection with a selective change-speed transmission gearing mechanism 13 of any suitable type employing shiftable members for changing the gear ratio between a driving and a driven shaft. As shown, such mechanism may be provided with a main shifter bar 14 carrying shifting member 15, which latter is adapted to select and move in a longitudinal direction, one of a plurality of auxiliary shifter bars 16, 17 or 18 to effect a desired gear relation. A power device 19 is provided for moving the shifting member 15 laterally in opposite directions to select a desired shifter bar and a second power device 20 is employed for moving the said member and selected shifter bar longitudinally, and these power devices are preferably operated by a fluid pressure differential. As shown, the said devices are operated by air under pressure from reservoirs 21 and 22 in a manner which will appear more fully hereinafter, it being expressly understood, however, that the fluid means herein disclosed has been shown by way of example only and that any suitable fluid may be utilized.

Control means are provided by the present invention for manually controlling the flow of fluid under pressure to the power devices 19 and 20 for effecting a remote control of the operation of said devices and preferably such control means are so constituted as to be readily accessible to the operator and operable in a manner simulating the movements of a conventional manually-operable gear shift lever, whereby the movements of said control mechanism will be similar to the movements imparted to the manually-shiftable lever of a conventional selective change-speed transmission. As shown, such manually-operable control mechanism indicated generally at 23 comprises a pivotally-mounted manually-operable dummy gear shift lever 24 capable of lateral and longitudinal movements in opposite directions in the same manner as the corresponding movements of a conventional gear shift lever. Preferably, such lateral and longitudinal movements of the lever 24 are guided by suitably shaped slots 25 formed in a cover plate 26 secured to a casing 27 housing the said mechanism, the shape and positioning of the said slots conforming to the configuration necessary to properly guide the lever 24. A pair of similar valve mechanisms 28 and 29 are provided for controlling the movement of the power device 19, the operation of these valve mechanisms being effected by lateral movement of the control lever 24, while another pair of valve mechanisms 30 and 31, similar in construction to valves 28 and 29, are provided for controlling the operation of the power device 20, such latter valve mechanisms being operated upon longitudinal movement of the control lever 24. Thus it will be seen, as heretofore stated, that lateral movements of the control lever 24 will effect a selection of the desired auxiliary shifter bar and that longitudinal movements of the said control lever will effect longitudinal movement of the selected shifter bar to accomplish the desired gear relation, these operations taking place in a manner simulating the corresponding movements of a conventional manually-operated gear shift lever.

In order that the degree of pressure supplied to the pressure device 20 and hence the operation of the main shifter bar 14 moved thereby may be accurately controlled, a fluid pressure-operated relay or pilot device 32 is provided, the operation of which depends upon the functioning of valves 30 and 31. The energization of this relay effects a control of the fluid pressure admitted to the device 20 through the medium of a valve mechanism 33, the latter preferably being of the follow-up type and having cooperating portions connected with the movable element of the relay and the main shifter bar 14 respectively, the construction being such that when the valve is operated to admit fluid under pressure to the device 20, operation of the latter will effect a lapping of the valve mechanism and hence an interruption of the power fluid. In this manner, the movement of the main shifter bar 14 may be readily controlled in a manner proportional to the extent of longitudinal movement of the control lever 24.

With the above brief general description of the main constituent parts of the arrangement constituting the present invention, reference will now be had to the remaining figures of the drawings illustrating the various parts of the system more in detail. Referring more particularly to Figs. 2 to 5, the housing 27 of the control mechanism 23 is centrally formed with a seat 34 for receiving the spherical end 35 of the control lever 24, a suitable retaining nut 36 being provided for maintaining the end 35 in position, the arrangement being such that the control lever is mounted for universal movement. The control lever is also provided adjacent its lower extremity with a curved cam surface 37 adapted, when the control lever is moved out of its central position, to operate one or another of the valve mechanisms 28, 29, 30 or 31 through the intermediary of a rocker arm 38 suitably pivotally mounted upon a pin 39 carried in lugs 40 formed integrally with the control mechanism casing. Each of the rocker arms 38 is provided at one extremity with a cam roller 41 directly engaging the cam surface 37, and at the other extremity with an adjustable screw 42 for direct engagement with the valve-operating element.

Each of the control valves 28 to 31 is similar in construction and is preferably of the pressure-lapped type and so constituted as to exert a resistance to opening movement proportional to the applied force. As shown, each of the valve mechanisms comprises a circular well 43 formed in the mechanism casing, each of said wells being provided with an exhaust port 44 communicating with a centrally-disposed exhaust chamber 45. Each well is also provided with an intake port 46 communicating with a centrally-disposed inlet chamber 47, the latter communicating through a suitable conduit 48 with the reservoir 21. The lower portion of each valve-receiving well is provided with an intake valve 49 normally resiliently urged as by means of a spring 50 against a seat 51, thus normally closing off communication between the intake chamber 47 and an outlet chamber 52 which communicates through a duct 53 and suitable conduits with one of the control devices associated with the transmission. With reference to Fig. 1, the outlet ports 53 are connected to conduits 54, 55, 56 and 57 for the valves 28 to 31 respectively. The exhaust chamber 45 communicates with the atmosphere through a suitable conduit 58.

Directly connected to the intake valve 49 is an exhaust valve 59 normally spaced from a seat 60 formed on a centrally-bored piston member 61. The latter is provided with communicating ducts 62 and 63 which normally provide communication between the exhaust chamber 45 and the chamber 52 through the normally open valve 59. In the normal position of the parts, opposed springs 64 and 65 act upon the piston 61 in such a manner that the above referred to communication between chambers 52 and 45 is established. The spring 64 is normally confined between the piston 61 and a cup 66, the latter constituting the valve-actuating element and being provided with a socket 67 for receiving the upwardly-extending central portion 68 of the piston 61, and a button 69 on the top thereof for engagement with the screw 42.

From the above description, it will be apparent that all four of the valves 28 to 31 inclusive are so positioned that the outlet chambers 52 will all communicate with the atmosphere. Upon movement of the control lever 24 to the right, as shown in dotted lines on Fig. 2, lever 38 will be moved clockwise about its pivotal mounting 39 to effect a movement of cup 66 downwardly which through spring 64 will serve to move piston 61 until communication between chambers 52 and 45 is interrupted by engagement of the seat 60 with the exhaust valve 59. Further downward movement of the piston 61 will thereafter result in a slight opening of the intake valve 49, against the resistance of spring 50, whereupon fluid under pressure from the intake chamber 47 will be led through duct 46 into the chamber 52 and through duct 53 to the conduit 57 shown in Fig. 1. It will be apparent that as the pressure of the fluid in chamber 52 builds up due to the opening of the intake valve, there will be a tendency for piston 61 to move upwardly in opposition to the applying force. As soon as the force under the said piston, due to such pressure and the expansive effect of spring 65, becomes sufficiently great to slightly overcome the applying force, the said piston will move upwardly slightly and spring 50 will effect a lapping of the intake valve 49. Such upward movement of the piston, after the valve mechanism has been placed in operation, enables a feel or reaction to be experienced by the operator when manually operating the control lever 24, to the end that he will be more readily able to accurately control the flow of fluid under pressure to the pressure-operated devices associated with the transmission. After a closure or lapping of the intake valve, it will be readily understood from the above that the pressure within chamber 52 will be proportional to the extent of movement of rocker arm 38 and hence the extent of movement of control lever 24. Thus the degree of pressure within conduits 54—57 and hence within the controlling devices 19 and 32 may be readily controlled by the extent of movement of the control lever. It will also be apparent from the above that lateral movement of control lever 24 in either direction will effect operation of the oppositely-disposed valves 28 and 29 while longitudinal movement in either direction in any of the longitudinally-disposed slots in the cover plate 26 will effect operation of the valve mechanisms 30 or 31.

In order to lock the control lever 24 in neutral position or in the extremities of the longitudinally-disposed slots 25, the control lever 24 is provided with a control sleeve 70 normally resiliently urged downwardly as by means of a spring 71 confined between the said sleeve and a ball or grip 72 positioned at the upper end of the lever. The edges of the plate 26 defining the slots 25 are preferably slightly beveled as indicated at 73 and the lower end of the sleeve 70 is almost in engagement with said edges, the movement of sleeve 70 toward the latter being limited, however, by engaging shoulders 74 and 75 on the sleeve and control lever respectively. With this construction, it will be apparent that before movement of the lever 24 in any direction may be effected, the operator must first move the sleeve 70 upwardly against the tension of spring 71, as by means of grasping a cap 76 formed on said sleeve at the time the grip 72 is grasped. Preferably the casing 27 is provided with a bracket 77 in order to enable the control mechanism to be attached to the motor vehicle steering column below the steering wheel, this method of assembly enabling the control device to be readily accessible to the operator.

Figure 6:
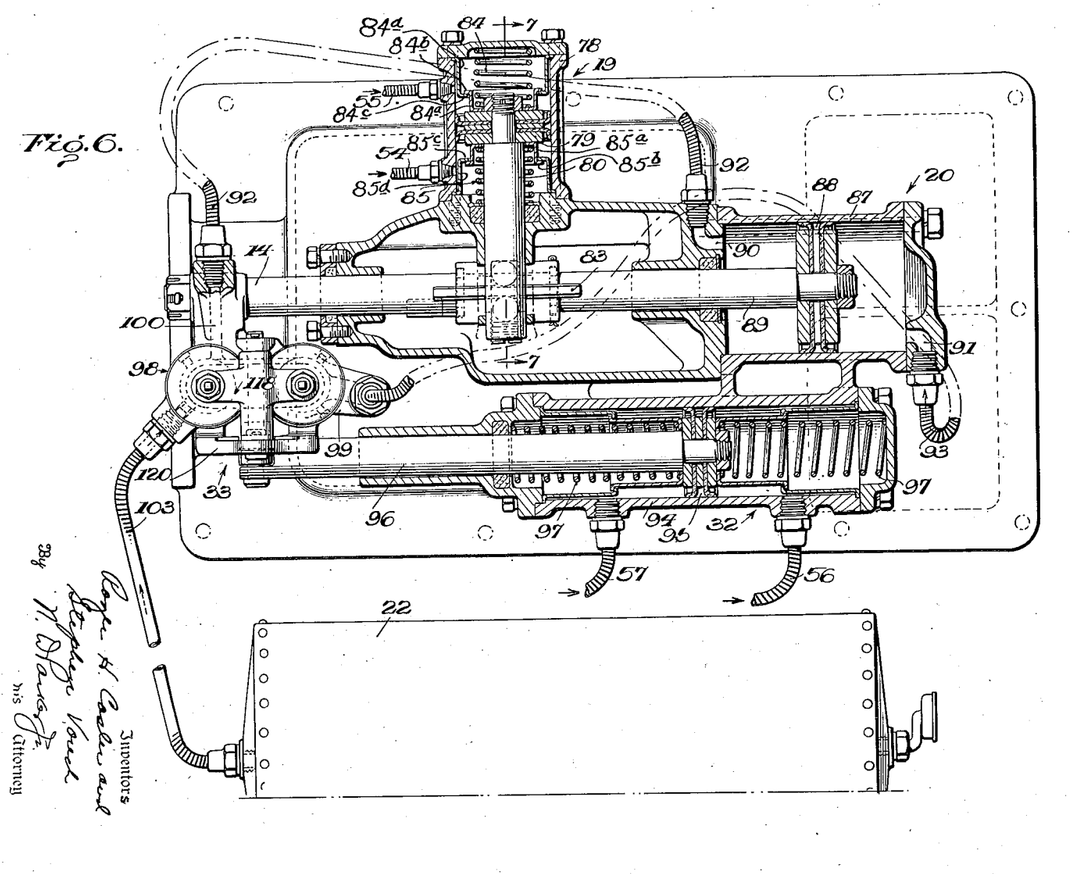
Fig. 6 is a sectional plan view of the power control mechanism of the present invention illustrating the same associated with a selective change-speed transmission.
Figures 7, 8, 9:
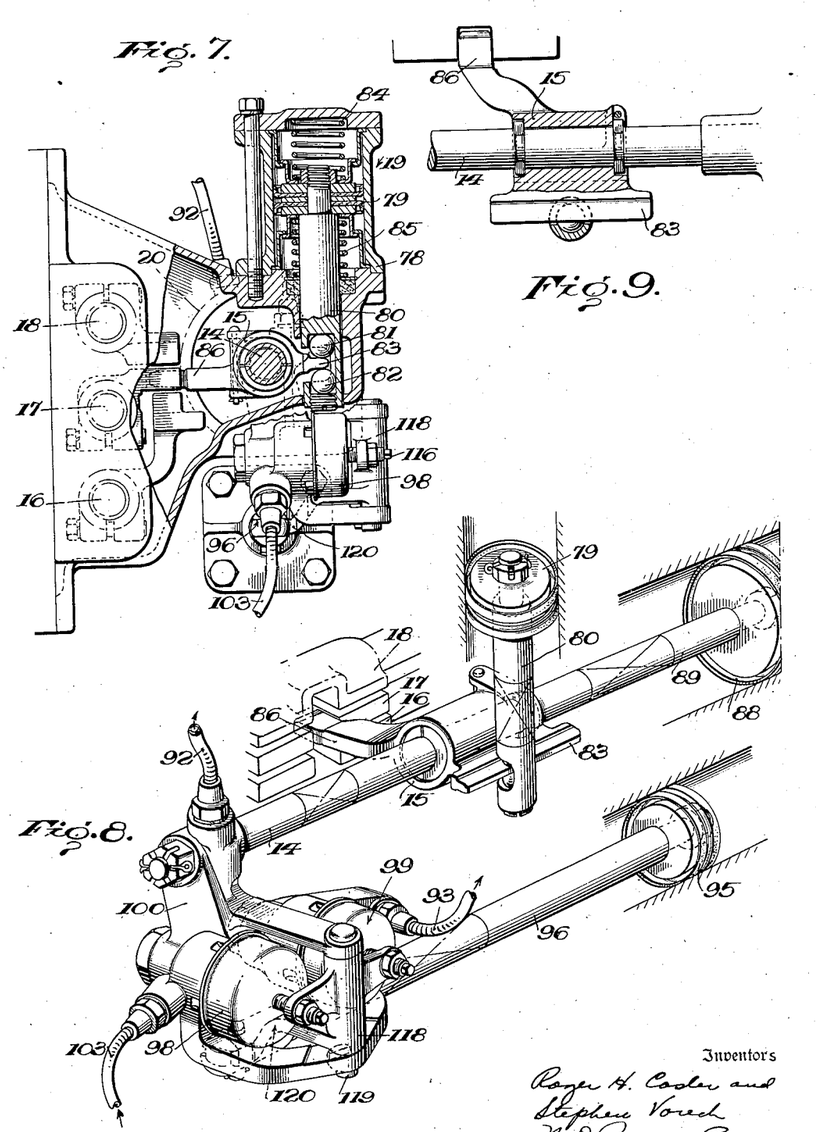
Fig. 7 is an end view, partly in section, of a transmission and one of the power devices shown in Fig. 7 and taken along line 7—7 of said figure.
Fig. 8 is a perspective view of the main shifter bar of the transmission and the power-operated devices associated therewith.
Fig. 9 is a detailed sectional view of the main shifter bar and shifting member carried thereby.
Figure 10:
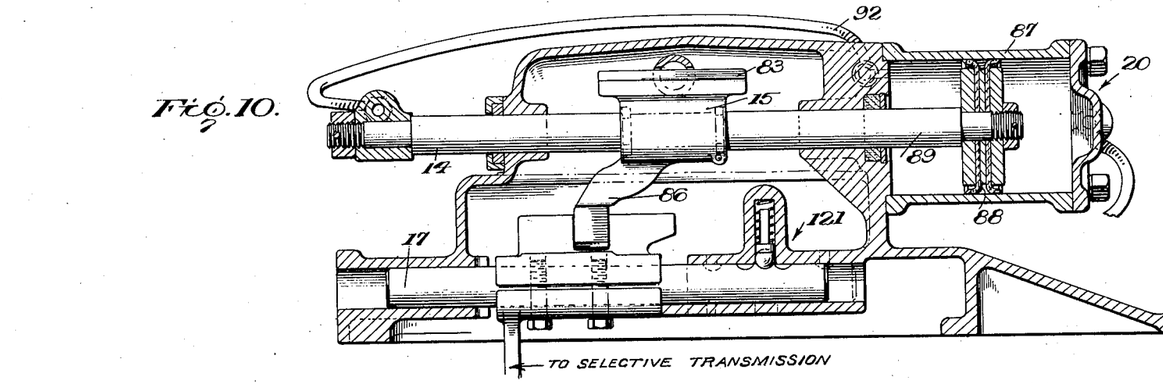
Fig. 10 is a side view, partly in section, of the power-operated main shifter bar and illustrates the manner of connecting the shifting member to an auxiliary shifter bar of the transmission.

The power device 19, heretofore described as effecting lateral movement of the shifting member 15, is preferably of the double-acting type and includes a cylinder 78 housing a piston 79, Figs. 6 and 7. The latter has connected thereto a suitable piston rod 80, the lower extremity of which is formed with a recess for receiving ball bearings 81 and 82 between which an arm 83 of the shifting member 15 projects, the construction being such that longitudinal movement of the piston rod will effect movement of the member 15 in one direction, while permitting the latter to be moved transversely of the piston rod 80 in a substantially frictionless manner. Preferably a pair of precompressed springs 84 and 85 are disposed upon either side of the piston 79 in order to bring the latter to mid position upon exhaustion of fluid pressure from either side of the cylinder, this movement bringing the shifting member 15 also to central or neutral position wherein the end portion 86 thereof, Fig. 7, is positioned mid-way between the outermost auxiliary shifter bars 16 and 18 and in engagement with the central auxiliary shifter bar 17. As shown, the springs 84 and 85 are initially precompressed when assembling the parts constituting device 19, the same being confined between the cylinder heads and cups 84a and 85a respectively. The latter are provided with outwardly-turned circumferential flanges 84b and 85b respectively engaging corresponding flanges 84c and 85c upon cups 84d and 85d, these last mentioned elements being secured at their opposite ends to the cylinder 78 in any suitable manner. From this construction, it will be readily observed that when fluid pressure is exhausted from both sides of device 19, the springs 84 and 85 will quickly center the piston 79, the engagement of flanges 84b with 84c or 85b with 85c constituting a positive limit stop for insuring that under these conditions the piston 79 will be precisely centered and the shifter finger 86 controlled thereby properly neutralized.

From the above description of the power device 19, it will be understood that the parts normally occupy the positions shown on Figs. 1, 6 and 7 wherein the shifting member 15 is neutralized and the end portion 86 thereof is in engagement with the intermediate auxiliary shifter bar 17. Upon admission of fluid under pressure to the lower side of cylinder 78, for example, by operation of valve mechanism 28, the shifting member 15 will be moved laterally to effect selection of the auxiliary shifter bar 16 while fluid under pressure admitted to the upper part of cylinder 78 would have caused the shifting member 15 to have selected the auxiliary bar 18. Upon exhaust of fluid under pressure from either side, however, the resilient means 84 and 85 will immediately return the shifting member 15 to neutral position. In the transmission mechanism disclosed, it has been assumed for purposes of illustration that the shifter bar 16 in its reciprocating movements to the left and right, Fig. 1, will effect engagement of first and second gear respectively, while corresponding reciprocating movements of the auxiliary shifter bar 17 will effect engagement of third and fourth speeds. Reciprocation of the auxiliary shifter bar 18 to the right, Fig. 1, will effect engagement of the reverse gear, these elements corresponding to the gear changes of a well-known commercial selective transmission. These elements, however, are for purposes of illustration only, it being understood that the invention is equally well applicable to selective transmissions involving other speed-changing combinations.

After selection of the desired auxiliary shifter bar by operating the power device 19, as set forth above, fluid under pressure is admitted to the power device 20 to control longitudinal movement of the shifting member 15 and the selected shifter bar to effect the desired gear relation. Referring to Figs. 1, 6, 8, 9 and 10, the power device 20 preferably comprises a double-acting cylinder 87 having a piston 88 therein provided with a piston rod 89, which latter is extended to form the main shifter bar 14 and on which the shifting member 15 is mounted in such a manner as to be rotatable of said rod but longitudinally movable therewith. Upon either side of the piston 88, cylinder 87 is provided with openings 90 and 91 communicating with the valve mechanism 33 through suitable conduits 92 and 93 respectively.

Preferably, as heretofore stated, the flow of fluid pressure to the power device 20 is controlled by a fluid pressure-operated pilot or relay device 32 and, as shown, Figs. 1, 6 and 8, such relay is constituted by a double-acting cylinder 94 having a reciprocating piston 95 therein to which is secured a piston rod 96. The piston 95 is preferably resiliently biased to central position by means of precompressed springs 97 in order that the said piston may be immediately returned to central or neutral position upon exhaustion of fluid under pressure from either side thereof. The control of fluid under pressure to the relay or pilot device is effected, as above set forth, by means of valves 30 and 31, which latter are controlled by the longitudinal movements of the control lever 24, the construction being such that operation of the valve 30 will admit fluid under pressure through conduit 56 to the right end of the relay, while operation of the valve 31 will admit fluid under pressure through conduit 57 to the left end portion of the relay, see Fig. 6. Admission of fluid pressure to either end of the relay will effect longitudinal movement of piston rod 96 and consequent operation of the valve mechanism 33 associated therewith to control the flow of fluid under pressure to the power device 20 in a manner which will appear more fully hereinafter.

Figure 11:
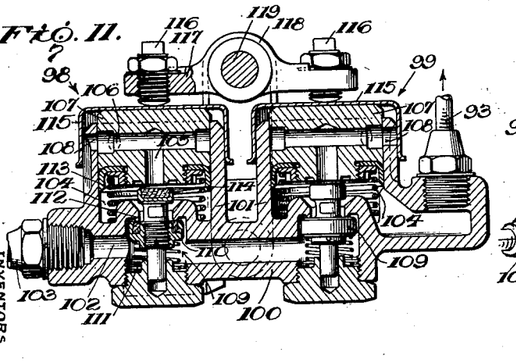
Fig. 11 is a sectional view of a control valve mechanism employed with the present invention.
Figure 12:
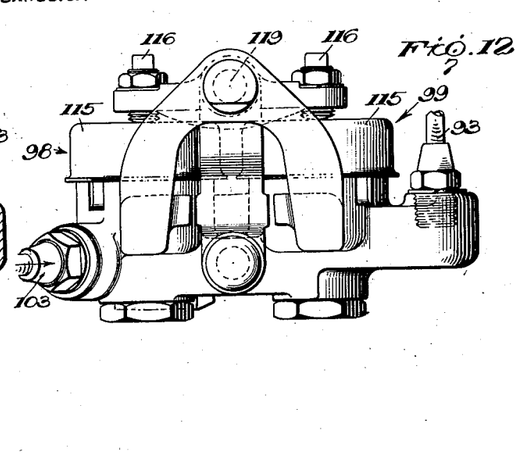
Fig. 12 is a side view of the valve mechanism of Fig. 11.

As heretofore stated, the follow-up valve mechanism 33 is formed of cooperating elements carried by the main shifter bar 14 and the piston rod 96 of the relay 32 respectively in order that the movements of the former may be readily controlled by relative movement between these two elements to effect an accurate control of the degree of pressure and hence the extent of movement of the pressure device 20. To this end, the valve mechanism 33 comprises a pair of similarly-constructed valves 98 and 99, Fig. 11, which are structurally quite similar to the valves 29 to 31, each of the first mentioned valves being housed within a casing 100 rigidly secured to the free end of the main shifter bar 14, Figs. 6 and 8. The casing 100, see Fig. 11, is provided with a pair of wells 101 for receiving the valves 98 and 99, the casing being provided with an inlet opening 102 communicating through a suitable conduit 103 with the auxiliary reservoir 22 for conducting fluid under pressure from said reservoir to the outlet chambers 104, the latter being normally open to the atmosphere through ducts 105 and 106 provided in piston 107. The last named duct normally communicates with the atmosphere through ports 108 positioned in the side wall of the wells 101. A combined intake and exhaust valve structure 109 having an intake valve element 110 is normally resiliently urged as by means of a spring 111, to such a position that the intake valve contacts a seat 112 formed in the casing 100 to close off communication between the chamber 104 and duct 105. The pistons 107 are normally biased to the position shown by means of springs 113 which maintain the said pistons spaced from an exhaust valve element 114. Each of the pistons 107 is provided with a suitable dust cover 115 in constant engagement with actuating screws 116 carried by arms 117 of a valve applying rocker lever 118, the latter being suitably journaled upon a pivot pin 119 carried by the casing 100 and having an arm 120 formed integrally therewith and connected in any suitable manner to the free end of the relay piston rod 96, Figs. 7 and 8. From this construction, it will be readily observed that movement of the relay piston rod 96 in either direction will, through arm 120, rock member 118 to operate one or the other of the valves 98 or 99 for effecting closure of the exhaust valve 114 and opening of the intake valve 110, thereby permitting fluid under pressure to be conducted from the auxiliary reservoir 22 through conduit 103 to the proper chamber 104. In the case of valve 98, the chamber 104 is connected through the conduit 92 to the left-hand end of the power device 20, Fig. 6, while in the case of valve 99, the chamber 104 communicates with the right-hand end of the said power device through conduit 93. In either event, that is upon actuation of either of the said valve elements, as soon as fluid under pressure has been conducted to the power device 20, the piston 88 and main shifter bar 14 move in the desired direction and move the valve casing 100 in a manner to effect a lapping of the operated valve. As soon as the said valve has become lapped, further movement of the piston 88 will be arrested until additional fluid under pressure has been admitted to the relay 32 to again effect operation of the desired valve mechanism, it being pointed out that longitudinal movement of each auxiliary shifter bar is resisted by means of suitable spring detent devices 121, Fig. 10. Thus the piston 88 follows every movement of the relay piston 95, the latter thereby exercising an accurate control over the former.

From the above description, it will be apparent that in order to shift into first gear, it is only necessary to move the dummy gear shift lever 24 laterally to the position a and then longitudinally forwardly, Fig. 1. The lateral movement will operate valve mechanism 28 permitting fluid under pressure to flow from reservoir 21 through conduits 48 and 54 to the lower portion of power device 19 whereupon the latter, through the upward movement of piston rod 80, will move the shifting member 15 in such a direction as to associate the operating end 86 thereof, Figs. 7 and 8, with the auxiliary shifter bar 16. The subsequent longitudinal movement of the control lever, after selection of the shifter bar 16, will effect operation of the valve mechanism 30, thus permitting fluid under pressure to be conducted from the reservoir 21 through conduits 48 and 56 to the right-hand end of the relay 32, Fig. 1. As the piston 95 of the latter moves to the left, as viewed in this figure, the rocker member 118 will be operated through arm 120 to open valve mechanism 99 thus establishing communication between the auxiliary reservoir 22 and the right-hand end of power device 20 through conduits 103 and 93. Movement of the piston 88 will then shift the main shifter bar 14 and shifting member 15 carried thereby, to the left thereby moving the selected shifter bar 16 in a corresponding direction to establish first gear relation, it being appreciated that due to the follow-up feature of valve 99, the extent of movement of the selected shifter bar, against the resistance of the resilient device 121, Fig. 10, will be controlled by the degree of pressure within device 32, which degree of pressure is in turn controlled by the extent of movement of the control lever.

In shifting into second gear, the control lever is moved longitudinally in the opposite direction from that occupied above, which movement will cause the shifter bar 16 to be correspondingly shifted. When the control lever is initially moved rearwardly, the valve 30 will be moved to exhaust position by means of springs 64 and 65 whereupon the relay 32 will be exhausted and the springs 97 associated therewith will quickly bring the piston 95 of said device to central position. It will be appreciated that as the latter movement occurs, the valve rocking lever 118 will be moved in a direction opposite to that occupied above, to exhaust the right-hand end of device 20 through valve mechanism 99 and to operate valve mechanism 98 to communicate the left end of device 20 with the auxiliary reservoir. The piston 88, main shifter bar 14 and the auxiliary shifter bar 16 will thereupon be moved to the right, Fig. 1. If the control lever is arrested in its longitudinal movement intermediate its extreme positions, that is, before actuation of valve 31, the shifter bars 14 and 16 will be returned to and will remain in central position due to the lapping and exhausting of valve 98. As soon as valve 31 has been operated, however, by continued rearward longitudinal movement of the control lever, fluid under pressure will be conducted through conduits 48 and 57 to the left end of the relay 32 whereupon the reverse of the above described movements of the relay and power device 20 will be effected, and second gear relation will be established.

When shifting to third gear, the control lever 24 will be moved back to the normal neutral position indicated in Fig. 1 where the shifting member 15 automatically selects the central auxiliary shifter bar 17. During this movement of the control lever, the valves 31 and 28 will be exhausted in the order named, the first enabling the centralization of pistons 95 and 88 and the second enabling the centralization of piston 79 by means of springs 84 and 85. Thereafter, forward movement of the lever 24 will effect operation of valve 30 to admit fluid under pressure to the right end of relay 32 which in turn will operate valve 99 to admit fluid power to the corresponding end of device 20. The shifter bars 14 and 17 will thereupon be moved to the left, Fig. 1, and third gear relation established.

In order to shift into fourth gear, it is only necessary to effect a shift of the bars 14 and 17 in the opposite direction which is effected by moving the control lever 24 rearwardly to exhaust valve 30 and operate valve 31. The relay 32 and device 20 will thereupon be moved to the right in a manner similar to that above described when shifting from first to second gear.

Should it be desired to shift from neutral position to reverse, the control lever is initially moved laterally to the right, as shown at b, Fig. 1, to operate valve 29 to admit fluid under pressure to the top of device 19 through conduits 48 and 55. Downward movement of the piston 79 and rod 80 will move shifting member 15 such that the portion 86 thereof selects the auxiliary shifter bar 18, Figs. 1 and 8. Thereafter, rearward longitudinal movement of the control lever 24 will operate valve 31 thereby admitting fluid power to the left end of relay 32, moving the piston 95 therein to the right, and causing a corresponding movement of piston 88 of power device 20 together with shifter bars 14 and 18, in a manner similar to that described above.

There is thus provided by the present invention a novel remote control for a selective change-speed transmission, so constituted that the gear ratios are efficiently varied by fluid power through the agency of a manually-operable control element, or dummy gear shift lever operable in a manner simulating the movements of a conventional manually-operable gear shift lever. Such an arrangement permits an operator, accustomed to the manual operations necessary for gear shifting, to readily and efficiently operate a transmission equipped with the present invention. The provision of the pressure-lapped valves directly controlled by the movements of the control lever enables a feel or resistance to be encountered by the operator, while the provision of the fluid pressure relay and valve mechanism controlled thereby permits an exceedingly accurate control over the movements of the longitudinal shifting power device, to the end that the various gear relations may be established without clashing. The fluid pressure relay and the laterally-shifting power device are both provided with opposed precompressed resilient devices, such a construction enabling a rapid centralization of the actuated parts thereof and hence quick movement of the shifting member to neutral position. This arrangement insures the required neutralization of the gears of the transmission when shifting from one gear to another, and especially is this feature desirable when "double clutching," a phase of the gear-changing operation so generally practiced when shifting from one gear ratio to another.

While only one embodiment of the invention has been illustrated herein, it is to be expressly understood that the same is not limited thereto but is capable of being embodied in various forms, as well understood by those skilled in the art, without departing from the spirit of the invention. Reference will, therefore, be had to the appended claims for a definition of the limits thereof.

In using the terms "power means" or "power device" in certain of the claims appended hereto, in connection with the means or devices for selecting and establishing a desired gear relation, applicants intend that the meaning to be accorded such terms is that the said means or device shall be operable by power derived from an external source.

What is claimed is:

1. In a gear shifting mechanism comprising a shifting member operable to establish different gear relations, a control means therefor including pressure-operated devices for moving said member laterally and longitudinally for respectively selecting and establishing a desired gear relation, a plurality of valves for controlling the flow of fluid pressure to said devices, and a manually-operable control member movable laterally and longitudinally and simulating the movements of a conventional selective gear shift lever for operating said valves to control said devices in such a manner that said member is moved laterally and longitudinally in accordance with corresponding movements of said control member.

2. In a gear shifting mechanism comprising a shifting member having a part operable to establish different gear relations, a control mechanism therefor including pressure-operated devices for moving said part laterally and longitudinally for respectively selecting and effecting a desired gear relation, a manually-operable control lever mounted for movement in spaced-apart parallel paths and for movement from each path to the other, and means controlled by the last named movement and the first named movement of said lever for controlling the flow of fluid pressure to said devices to correspondingly control said devices to select and effect the desired gear relation.

3. In a gear shifting mechanism comprising a shifting member operable to establish different gear relations, a control mechanism therefor including a pressure-operated selecting device for moving said member laterally, a single pressure-operated shifting device for moving said member longitudinally to effect a desired gear relation, valve means for controlling the flow of fluid pressure to said first device, valve means for controlling the flow of fluid pressure to said second device, and a single control lever movable in one plane for controlling said first valve means and movable in a second plane disposed at a right angle to said first plane for controlling the second valve means to respectively effect said lateral and longitudinal movements of the member.

4. In a gear shifting mechanism comprising a shifting member operable to establish different gear relations, a control mechanism therefor including pressure-operated devices for moving said member laterally and longitudinally for respectively selecting and establishing a desired gear relation, and a pivotally-mounted lever positioned remotely from said devices and mounted for movement in spaced-apart parallel paths and for movement from each path to the other, means controlled by the last named movement and the first named movement for controlling the flow of fluid pressure to said devices to correspondingly control said devices to select and establish the desired gear relation.

5. A fluid pressure control mechanism for a gear shifting apparatus having a shifting member laterally and longitudinally movable to establish different gear relations comprising a fluid pressure-operated device for moving said member laterally, a fluid pressure-operated device for moving said member longitudinally, a fluid pressure-operated relay for controlling the flow of fluid pressure to said second named device, and a control member having lateral and longitudinal movements simulating the operation of a conventional selective gear shift lever for controlling the flow of fluid pressure to said first named device and to said relay.

6. In a control member for a gear shifting apparatus having a shifting member movable laterally and longitudinally to engage and move one or another of a pair of shifter bars to establish different gear relations, a double-acting fluid pressure-operated device for moving said member laterally, opposed resilient means cooperating with said device and normally maintaining said member intermediate said shifter bars, and a manually-operable control lever laterally movable in either direction for controlling the flow of fluid pressure to either end of said device to effect lateral movement of said member.

7. A fluid pressure control mechanism for a gear shifting apparatus having a shifting member laterally and longitudinally movable to establish different gear relations comprising a fluid pressure-operated device for moving said member laterally, a fluid pressure-operated device for moving said member longitudinally, a manually-operable control member movable in one direction for controlling the flow of fluid pressure to said first named device, and means dependent upon the extent of movement of said control member in another direction for controlling the degree of pressure within said second named device.

8. In a control mechanism for a gear shifting apparatus having a shifting member movable laterally and longitudinally to establish different gear relations, a pressure-operated device for moving said member laterally, a double-acting cylinder having a piston connected with said member for moving the latter longitudinally in opposite directions, a valve-casing associated with said piston, a pair of valve members in said casing for selectively controlling the flow of fluid pressure to either end of said cylinder, a fluid pressure-operated relay for selectively operating said valve members, and manually-operable valve means for controlling the operation of said relay.

9. In a control mechanism for a gear shifting apparatus having a shifting member movable laterally and longitudinally to establish different gear relations, a pressure device for moving said member laterally, a double-acting cylinder having a pressure-responsive element connected with said member for moving the latter longitudinally in opposite directions, a pressure-operated relay having a pressure-responsive element, means for controlling the operation of said relay, and follow-up valve means having cooperating parts associated with said double-acting and said relay pressure-responsive elements respectively for controlling the flow of fluid pressure to said double-acting cylinder.

10. In a control mechanism for a gear shifting apparatus having a shifting member movable laterally and longitudinally to establish different relations, a pressure device for moving said member laterally, a pressure device for moving said member longitudinally in opposite directions, and means for controlling the flow of fluid pressure to said second named device including a double-acting fluid pressure-operated relay cylinder and piston, said cylinder having precompressed springs therein disposed on either side of said piston.

11. A fluid pressure control mechanism for a gear shifting apparatus of the type having a shifting member laterally and longitudinally movable to establish different gear relations comprising a fluid pressure-operated device for moving said member laterally, a fluid pressure-operated device having a pressure-responsive element for moving said member longitudinally, a fluid pressure-operated relay having a pressure-responsive element, means for controlling the operation of said relay and valve means operable by relative movement between said elements for controlling the flow of fluid pressure to said second named device.

12. In a selective gear shifting mechanism having a shifting member movable laterally and longitudinally to respectively select and establish different gear relations, a pressure-operated device for moving said member laterally in opposite directions, opposed precompressed resilient means associated with said device and normally maintaining said member in a neutral position, a pressure-operated device for moving said member longitudinally in opposite directions, and a pivotally-mounted lever positioned remotely from said devices and operator-controlled in a selective gear shifting simulating manner for controlling the flow of fluid pressure to said devices.

13. In a gear shifting mechanism, a control therefor comprising a shifting member operable to select and establish different gear relations, power means for moving said member laterally and longitudinally to respectively select and establish a desired gear relation, and a pivotally-mounted lever positioned remotely from said means and mounted for movement in spaced-apart parallel paths and for movement from each path to the other for controlling said means.

14. In a selective gear shifting mechanism having a shifting member movable laterally and longitudinally to select and establish different gear relations, a pressure-operated device for moving said member laterally in opposite directions, opposed precompressed resilient means associated with said device and normally maintaining said member in a neutral position, a pressure-operated device for moving said member longitudinally in opposite directions, a fluid pressure-operated relay, means for controlling said relay, valve means dependent upon operation of said relay for controlling the flow of fluid pressure to said second named device, and a manually-operable control member movable laterally in opposite directions for controlling the flow of fluid pressure to said first named device and movable longitudinally in opposite directions for controlling the flow of fluid pressure to said relay.

15. In a selective gear shifting mechanism having a shifting member laterally and longitudinally movable to select and establish different gear relations, a fluid pressure-operated device for moving said member laterally in opposite directions to select a desired gear relation, opposed precompressed resilient means associated with said device and normally maintaining said member in a neutral position, a fluid pressure-operated device for moving said member longitudinally in opposite directions to effect the desired gear relation after selection thereof, means including a fluid pressure-operated relay and a follow-up valve controlled by said second named device and said relay for controlling the flow of fluid pressure to said second named device, and a pivotally-mounted lever positioned remotely from said devices and movable laterally and longitudinally in a selective gear shifting simulating manner for respectively controlling the flow of fluid pressure to said first device and said relay.

16. The combination with a selective transmission mechanism having a plurality of axially-spaced shifter bars movable longitudinally to establish different gear relations, of a shifter member normally in operative relation with one of said shifter bars but laterally movable in opposite directions to select one or another of the other shifter bars, a double-acting fluid pressure motor operatively connected with said shifter member to shift the same laterally in opposite directions, resilient means associated with said motor for normally maintaining said shifter member in said normal position, a double-acting fluid pressure motor operatively connected with said shifter member for moving the same together with the shifter bar selected thereby longitudinally in opposite directions, a double-acting fluid pressure relay, a follow-up valve mechanism having operating elements associated with said second named motor and said relay respectively, said valve mechanism controlling the flow of fluid power to said second named motor, two pairs of valves for respectively controlling the flow of fluid power to said first named motor and to said relay, and a manually-operable control lever movable in a gear shifting simulating manner for controlling the operation of said valves.

17. The combination with a selective transmission mechanism having a plurality of axially-spaced shifter bars movable longitudinally to establish different gear relations, of a shifter member normally in operative relation with one of said shifter bars but laterally movable in opposite directions to select one or another of the other shifter bars, a double-acting fluid pressure motor operatively connected with said shifter member to shift the same laterally in opposite directions, resilient means associated with said motor for normally maintaining said shifter member in said normal position, a double-acting fluid pressure motor operatively connected with said shifter member for moving the same together with the shifter bar selected thereby longitudinally in opposite directions, a double-acting fluid pressure relay, a follow-up valve mechanism having operating elements associated with said second named motor and said relay respectively, said valve mechanism controlling the flow of fluid power to said second named motor, resilient means associated with said relay for normally maintaining said valve mechanism in such position that said second named motor will be inoperative to move said shifter member in either direction, valve means for controlling the flow of fluid under pressure to said first named motor, valve means for controlling the flow of fluid under pressure to said relay, and a control lever movable laterally for controlling said first named valve means and movable longitudinally for controlling said second named valve means, said movements of said control lever simulating the movements of a manually-operable gear shifting lever when manually changing the gear relations of said transmission.

18. In a gear shifting mechanism comprising a shifting member operable to establish different gear relations, controlling means therefor including pressure-operated means for moving said member laterally for selecting a desired gear relation, pressure-operated means for moving said member longitudinally to establish the selected gear relation, and means including a manually-operable control member movable laterally for controlling said first named pressure-operated means, and movable longitudinally for controlling said second named pressure-operated means.

19. In a gear shifting mechanism comprising a shifting member operable to establish different gear relations, control means therefor including fluid-operated means for moving said member laterally for selecting a desired gear relation, fluid-operated means for moving said member longitudinally to establish the selected gear relation, means for controlling the flow of power fluid to said first named means, means for controlling the flow of power fluid to said second named means, and a manually-operable member associated with said controlling means and movable laterally for effecting operation of said first named controlling means and movable longitudinally for effecting operation of said second named controlling means.

20. In a gear shifting mechanism comprising a shifting member operable to establish different gear relations, control means therefor including power-operated means for moving said member laterally for selecting a desired gear relation, power-operated means for moving said member longitudinally to establish the selected gear relation, means for controlling the flow of power to said first named means, means for controlling the flow of power to said second named means, and a manually-operable member cooperating with said controlling means and so constructed and arranged with respect to said controlling means as to effect operation of said first named controlling means upon lateral movement thereof and operation of both said controlling means upon combined lateral and longitudinal movement thereof from a neutral position.

21. In a gear shifting mechanism of the type comprising a shifting member operable to select and establish different gear relations and having separate power means for respectively moving said member laterally and longitudinally to select and establish a desired gear relation, the combination with said power means of a pivotally-mounted lever positioned remotely from said means, means for guiding said lever so that operator-controlled movement thereof will be confined in right-angularly arranged planes, said movement simulating the movement of a conventional selective gear shift control lever, and means controlled by movement of said lever in said planes to successively energize said power means to effect sequential lateral selective movement and longitudinal gear establishing movement of said member.

22. In a gear shifting mechanism of the type comprising a shifting member operable to establish different gear relations and having fluid power-operated devices for moving said member laterally and longitudinally for selecting and establishing a desired gear relation, the combination with said devices of a plurality of valves for controlling the flow of fluid power to said devices, and a manually-operable control lever movable laterally and longitudinally and simulating the movements of a conventional selective gear shift lever for controlling the operation of said valves to effect gear selecting and establishing movement of said member in a manner corresponding to the respective lateral and longitudinal movements of said lever.

23. In a control mechanism for a gear shifting mechanism having a shifting member movable laterally and longitudinally to select and establish a desired gear relation, a pressure-operated device for moving said member laterally, a cylinder having a piston connected with said member for moving the latter longitudinally, a follow-up valve mechanism for controlling the flow of fluid under pressure to said cylinder, a pressure-operated relay for operating said valve mechanism, and manually-operable valve means for controlling the operation of said relay and said device.

24. In a control mechanism for a shifting apparatus having a member movable longitudinally, power means including a double-acting fluid motor having a piston connected with said member for moving the latter longitudinally in opposite directions, and means for controlling said motor comprising a valve mechanism having a casing associated with said piston, valve members in said casing, a fluid pressure-operated relay for selectively operating said valve members, and manually-operable means for controlling the operation of said relay.

25. In a control mechanism for a shifting apparatus having a member movable longitudinally, power means including a double-acting fluid motor having a piston connected with said member for moving the latter longitudinally in opposite directions, and means for controlling said motor comprising a pressure-operated relay having a piston, follow-up valve means having cooperating elements operatively connected with said pistons, respectively, and a manually-operable member for controlling the flow of fluid to said relay.

26. In a control mechanism for a shifting apparatus having a member movable longitudinally, fluid pressure-operated means for moving said member in opposite directions, means including a fluid pressure-operated relay for controlling the flow of fluid under pressure to said first named means, a manually-operable control member, and valve means operable in response to movement of said control member for controlling the flow of fluid under pressure to said relay, said valve means including a pressure-responsive element subjected to the pressure of the fluid conducted to said relay and thereby offering a resistance to movement of said control member in the direction to operate said valve means.

27. A fluid pressure control mechanism for a gear shifting apparatus having a shifting member laterally and longitudinally movable to establish different gear relations comprising a fluid pressure-operated device for moving said member laterally, a fluid pressure-operated device for moving said member longitudinally, a manually-operable control member, means dependent upon the extent of movement of said control member in one direction for controlling the degree of pressure within said first named device, and means dependent upon the extent of movement of the control member in another direction for controlling the degree of pressure within said second named device.

28. In a gear shifting mechanism of the type comprising a shifting member operable to establish different gear relations and having fluid power-operated devices for moving said member laterally and longitudinally for selecting and establishing a desired gear relation, the combination with said devices of a remotely-positioned manually-operable control member, and valvular mechanism operable by said member to control the flow of fluid power to said devices, said valvular mechanism embodying means subjected to the pressure of the fluid supplied to said devices and thereby offering a resistance to movement thereof by said control member in a degree proportional to the power required for establishing said gear relations.

29. In a gear shifting mechanism of the type comprising a shifting member operable to establish different gear relations and having fluid pressure-operated devices for moving said member, the combination with said devices of valvular means for controlling the flow of fluid under pressure thereto comprising a casing, a plurality of valve mechanisms within said casing, a universally-mounted manually-operable control lever positioned in said casing and having means for operating the valves, means associated with said casing for guiding said lever for limited reciprocating movements in planes at right angles, and means carried by said lever and cooperating with said guiding means for releasably holding the lever at the limits of its reciprocating movement in one plane.

30. In a gear shifting mechanism of the type comprising a shifting member operable to establish different gear relations and having fluid pressure-operated devices for moving said member, the combination with said devices of valvular means for controlling the flow of fluid pressure thereto comprising a casing, a plurality of valve mechanisms within said casing, a manually-operable control lever for operating said valves, a cover for said casing, said cover being provided with right-angularly arranged slots for guiding said lever for limited reciprocating movements in planes at right angles, and means carried by the lever and cooperating with said cover for releasably holding the lever at the limits of its reciprocating movement in one plane and intermediate the limits of its movement in the other plane.

31. In a gear shifting mechanism having a pair of shifting bars movable longitudinally to establish different gear relations, a control therefor comprising a manually-operable control member movable laterally and longitudinally in a selective gear shifting simulating manner and positioned remotely from said shifting bars, a shifting member having a portion thereof normally in engagement with one of said shifting bars, power means for moving said member in such a manner that said portion is moved laterally of and into engagement with the other shifting bar, a single power means for moving said member in such a manner that either of said shifting bars engaged by said portion is moved longitudinally to establish a desired gear shifting relation, and means respectively controlled by lateral and longitudinal movements of said control member for energizing said power means to effect said lateral and longitudinal movements of the portion of said shifting member in sequential relation.

32. The combination with a selective transmission mechanism having a plurality of axially-spaced shifter bars movable longitudinally to establish different gear relations, of a shifter member normally in operative relation with one of said shifter bars but laterally movable in opposite directions to select one or another of the other shifter bars, a double-acting fluid pressure motor operatively connected with said shifter member to shift the same laterally in opposite directions, resilient means associated with said motor for normally maintaining said shifter member in said normal position, a double-acting fluid pressure motor operatively connected with said shifter member for moving the same together with the shifter bar selected thereby longitudinally in opposite directions, and a manually-operable control lever movable in a gear shifting simulating manner for controlling the operation of said motors.

33. The combination with a selective transmission mechanism having a plurality of axially-spacer shifter bars movable longitudinally to establish different gear relations, of a shifter member normally in operative relation with one of said shifter bars but laterally movable in opposite directions to select one or another of the other shifter bars, a double-acting fluid pressure motor operatively connected with said shifter member to shift the same laterally in opposite directions, resilient means associated with said motor for normally maintaining said shifter member in said normal position, a double-acting fluid pressure motor operatively connected with said shifter member for moving the same together with the shifter bar selected thereby longitudinally in opposite directions, valve mechanism controlling the flow of fluid power to said second named motor, valve means for controlling the flow of fluid power to said first named motor, and a control lever movable laterally for controlling said valve means and movable longitudinally for controlling said valve mechanism, said movements of said control lever simulating the movements of a manually-operable gear shifting lever.

34. In a gear shifting mechanism of the type having a pair of shifting bars adapted to be selectively engaged and moved longitudinally to establish a desired gear relation, the combination therewith, of a remotely-positioned manually-operable control lever movable laterally and longitudinally in a selective gear shifting simulating manner, a shifting member, a power device operatively connected with said shifting member and normally resiliently biased to such a position as to maintain said member in engagement with one of said shifting bars, means controlled by lateral movement of said control lever for energizing said power device to move said member out of engagement with said one shifting bar and into engagement with the other shifting bar, a single double-acting power device connected with said member to actuate the latter to move either shifting bar engaged thereby in either of opposite directions, and means controlled by longitudinal movements of said control lever in opposite directions for energizing said single power device to effect said last named movements of the shifting bars.

35. In a gear shifting mechanism of the type comprising a shifting member operable to establish different gear relations and having power devices for moving said member, the combination with said devices, of means for controlling the energization of said devices comprising a casing, a plurality of control members within said casing, a manually-operable control lever for operating said control members, a cover for said casing, said cover being provided with right-angularly arranged slots for guiding said lever for limited reciprocating movements in planes at right angles, and means acting on said lever for releasably holding the latter at the limits of its reciprocating movements.

36. A fluid pressure control mechanism for a gear shifting apparatus having a shifting member provided with an operating portion movable laterally and longitudinally to respectively select and establish different gear relations comprising a power-operated device for effecting said lateral movement, a fluid pressure-operated device for effecting said longitudinal movement in opposite directions, and manually-controlled means for controlling energization of said power-operated device, said means including a single operating lever movable in opposite directions to control the degree of pressure within said fluid pressure-operated device in accordance with the extent of movement of the lever.

37. In a gear shifting mechanism of the type comprising a shifting member operable to establish different gear relations and having fluid pressure-operated devices for moving said member, the combination with said devices, of valvular means for controlling the flow of fluid pressure thereto comprising a casing, a plurality of valve mechanisms, valve control means within said casing, a manually-operable control lever positioned in said casing and having means for operating said valve control means, means associated with said casing for guiding said lever for limited reciprocating movements in planes at right angles, and means for releasably holding the lever at the limits of its reciprocating movement in one plane.

38. In a gear shifting mechanism having a pair of parallel shifting bars longitudinally movable to establish different gear relations, a shifting member oscillatable transversely of and into selective engagement with either of said bars, power means for oscillating said member, power means for effecting longitudinal movements of said member and the shifting bar engaged thereby, and means for controlling the operation of said power means including a manually operable control member movable in a selective gear-shifting simulating manner.

39. In a control mechanism for a gear-shifting apparatus having a shifting member movable in one plane to engage and in a right-angular plane to move one or another of a pair of shifter bars to establish different gear relations, a double-acting fluid pressure-operated motor for moving said member in opposite directions in said first named plane, opposed precompressed resilient means associated with said motor and normally maintaining said member intermediate said shifter bars, and a remotely-positioned manually-operable control lever movable to control the flow of fluid pressure to either end of said motor to effect movement of said member.

40. In a control mechanism for a gear-shifting apparatus having a shifting member movable in one plane to engage and in a right-angular plane to move one or another of a pair of shifter bars to establish different gear relations, a double-acting fluid pressure-operated motor for moving said member in opposite directions in said first named plane, precompressed resilient means associated with said motor and normally maintaining said member intermediate said shifter bars, means associated with said motor and resilient means for limiting expansion of the latter in opposite directions, and a remotely-positioned manually-operable control member movable to control the flow of fluid pressure to opposite ends of said motor to effect movement of said shifting member.

41. In a control mechanism for a shifting apparatus having a member movable longitudinally, power means including a double-acting fluid motor having a pressure-responsive element connected with said member for moving the latter longitudinally in opposite directions, and means for controlling said motor comprising a valve mechanism having a casing, valve members in said casing, fluid pressure-operated relay means for selectively operating said valve members, and manually-operable means for controlling the operation of said relay.

42. A gear shifting mechanism for a motor vehicle having a transmission provided with shifting means, comprising power means operative for moving said shifting means selectively to a plurality of operative positions, control mechanism including a plurality of control devices for rendering said power means operative, and fluid pressure means for selectively actuating said control devices.

43. A gear shifting mechanism for a motor vehicle having a transmission provided with shifting means, comprising differential pressure power means for moving said shifting means, control valve mechanism including a plurality of control valves for establishing pressure differentials in said power means for moving said shifting means selectively to a plurality of operative positions, and selectively operable fluid pressure means for actuating said control valves.

44. A gear shifting mechanism for a motor vehicle having a transmission provided with shifting means, comprising power means operative for moving said shifting means selectively to a plurality of operative positions, control mechanism including a plurality of control devices for rendering said power means operative, fluid pressure means for separately actuating said control devices, and remote manual control means for selectively determining the energization of said fluid pressure means.

45. A gear shifting mechanism for a motor vehicle having a transmission provided with shifting means, comprising differential pressure power means for moving said shifting means, control valve mechanism including a plurality of control valves for establishing pressure differentials in said power means for moving said shifting means selectively to a plurality of operative positions, fluid pressure means for separately actuating said control valves, and remote manual control means for selectively determining the energization of said fluid pressure means.

46. A gear shifting mechanism for a motor vehicle having a transmission provided with shifting means, comprising power means for moving said shifting means, control mechanism for energizing said power means to move said shifting means selectively to a plurality of operative positions, said control mechanism including a plurality of movable control elements, and selectively operable fluid pressure operated actuating means for said control elements.

47. A gear shifting mechanism for a motor vehicle having a transmission provided with shifting means, comprising power means for moving said shifting means, control mechanism for energizing said power means to move said shifting means selectively to a plurality of operative positions, said control mechanism including a plurality of movable control elements, means biasing each of said control elements in one direction, differential pressure operated means for said control elements including a plurality of pressure chambers, and means for controlling the pressure in each of said chambers for overcoming said biasing means.

48. A gear shifting mechanism for a motor vehicle having a transmission provided with shifting means, comprising differential pressure power means for moving said shifting means, control valve mechanism for establishing differential pressure in said power means to move said shifting means selectively to a plurality of operative positions, said control valve mechanism including a plurality of control valves, and fluid pressure means independent of said power means for selectively controlling the operation of said valves.

49. A gear shifting mechanism for a motor vehicle having a transmission provided with shifting means, comprising differential pressure power means for moving said shifting means, control valve mechanism for establishing differential pressure in said power means to move said shifting means selectively to a plurality of operative positions, said control valve mechanism including a plurality of control valves each movable to two operative positions, means biasing each of said valves to one of its positions, fluid pressure means for operating said valves including a plurality of pressure chambers, and remote control means for changing the pressure in each of said chambers to overcome the biasing means for each valve to move the latter to its other position.

50. A gear shifting mechanism for a motor vehicle having a transmission provided with shifting means, comprising power means connected to said shifting means, a plurality of control devices for said power means, each movable to two operative positions, means biasing each control device to one of its operative positions, and means for selectively overcoming the biasing means of either control device to move it to its other position.

51. A gear shifting mechanism for a motor vehicle having a transmission provided with shifting means, comprising power means operative for moving said shifting means selectively to a plurality of operative positions, control mechanism including a plurality of control devices for rendering said power means operative, fluid pressure means for actuating said control devices, and remote manual control means for selectively determining the energization of said fluid pressure means.

52. A gear shifting mechanism for a motor vehicle having a transmission provided with shifting means, comprising differential pressure power means for moving said shifting means, control valve mechanism including a plurality of control valves for establishing pressure differentials in said power means for moving said shifting means selectively to a plurality of operative positions, fluid pressure means for actuating said control valves, and remote manual control means for selectively determining the energization of said fluid pressure means.

53. A gear shifting mechanism for a motor vehicle having a transmission provided with shifting means, comprising power means for moving said shifting means, control mechanism for energizing said power means to move said shifting means selectively to a plurality of operative positions, said control mechanism including a plurality of movable control elements, means biasing each of said control elements in one direction, differential pressure operated means for said control elements including a plurality of pressure chambers, and means for controlling the pressure in each of said chambers for overcoming said biasing means.

54. A gear shifting mechanism for a motor vehicle having a transmission provided with shifting means, comprising differential pressure power means for moving said shifting means, control valve mechanism for establishing differential pressure in said power means to move said shifting means selectively to a plurality of operative positions, said control valve mechanism including a plurality of control valves each movable to two operative positions, means biasing each of said valves to one of its positions, fluid pressure means for operating said valves including a plurality of pressure chambers, and remote control means for changing the pressure in each of said chambers to overcome the biasing means for each valve to move the latter to its other position.

55. In a control mechanism for a shifting apparatus having a member movable in opposite directions, power means including a double-acting fluid motor having a pressure-responsive element operatively connected with said member for moving the latter in said opposite directions, and means for controlling said motor comprising a valve means provided with a casing, valves in said casing, fluid pressure means for selectively operating said valves, and remote manual control means for selectively controlling the operation of said fluid pressure means.

56. In a control mechanism for a gear shifting mechanism having a shifting member oscillatable to select and shiftable to establish a desired gear relation, a pressure operated device for oscillating said member, a cylinder having a pressure-responsive element operatively connected with said member for shifting the latter, follow-up valve mechanism having a part operatively connected with said element for controlling the application of fluid pressure to said cylinder, and means including a manually-operable member for controlling the application of fluid pressure to said device and for controlling operation of said valve mechanism.

57. In a control mechanism for a gear shifting mechanism having a shifting member oscillatable to select and shiftable to establish a desired gear relation, a pressure-operated device for oscillating said member, a cylinder having a pressure-responsive element operatively connected with said member for shifting the latter, follow-up valve mechanism having a part operatively connected with said element for controlling the application of fluid pressure to said cylinder, valve means for controlling the application of fluid pressure to said device, and means including a manually-operable member for controlling the operation of said valve means and valve mechanism.

58. A fluid pressure control mechanism for a gear shifting apparatus having a shifting member oscillatable to select and shiftable to establish different gear relations comprising a fluid pressure-operated device for oscillating said member, a fluid pressure-operated device for shifting said member, a manually-operable control member, means dependent upon movement of said control member in one direction for controlling the application of fluid pressure to said first named device, and means dependent upon the extent of movement of the control member in another direction for controlling the degree of pressure within said second device.

59. In a gear shifting mechanism of the type having a pair of shifting bars adapted to be selectively engaged and moved longitudinally to establish a desired gear relation, the combination therewith, of a remotely-positioned manually-operable control lever movable laterally and longitudinally in a selective gear shifting simulating manner, a shifting member, a power device operatively connected with said shifting member and normally resiliently biased to such a position as to maintain said member in engagement with one of said shifting bars, means controlled by lateral movement of said control lever for energizing said power device to move said member out of engagement with said one shifting bar and into engagement with the other shifting bar, a single double-acting power device connected with said member to actuate the latter to move either shifting bar engaged thereby in either of opposite directions, and means including follow-up valve mechanism controlled by longitudinal movements of said control lever in opposite directions for energizing said single power device to effect said last named movements of the shifting bars.

ROGER H. CASLER.
STEPHEN VORECH.